Dec. 20, 1955 F. G. NICOLAUS 2,727,433

SCORE PROJECTOR WITH SHIFTABLE OPTICAL SYSTEM

Filed June 8, 1951 3 Sheets-Sheet 1

Inventor:
Frank G. Nicolaus
By [signature] Atty.

Inventor:
Frank G. Nicolaus
By Carlton Livingston Atty.

SCORE PROJECTOR WITH SHIFTABLE OPTICAL SYSTEM

Filed June 8, 1951 3 Sheets-Sheet 3

Inventor:
Frank G. Nicolaus
By [signature] Atty.

United States Patent Office 2,727,433

Patented Dec. 20, 1955

2,727,433

SCORE PROJECTOR WITH SHIFTABLE OPTICAL SYSTEM

Frank G. Nicolaus, Chicago, Ill., assignor to Raymond T. Moloney, Chicago, Ill.

Application June 8, 1951, Serial No. 230,594

4 Claims. (Cl. 88—27)

The present invention pertains especially to means for extending the range of available numbers on a disc of limited diameter by having the number characters arranged in a progressive spiral about the axis of the disc and moving the light source and the projecting lens across the convolute series of numbers in a manner to be disclosed, it being known in the art to arrange numbers in a spiral pattern and to mask or obscure all but the desired number by various arrangements of shutters.

Accordingly, a more specific object of the invention is to provide an extended-range totalizer or score projector having a moving optical system consisting of a light source and lens means, and mechanism coacting with a number disc for moving the system to project the characters in different convolute number tracks on the disc in accordance with the increase or decrease of the values of numbers to be displayed.

Another object is the provision of a spiral tracking mechanism coacting with the movements of a number disc to shift a light source and lens means in a pattern determined by the angular movements of the disc.

Additional objects and aspects of novelty pertain to details of construction and operation of the illustrative embodiment described hereinafter in view of the annexed drawings in which.

Figure 1:
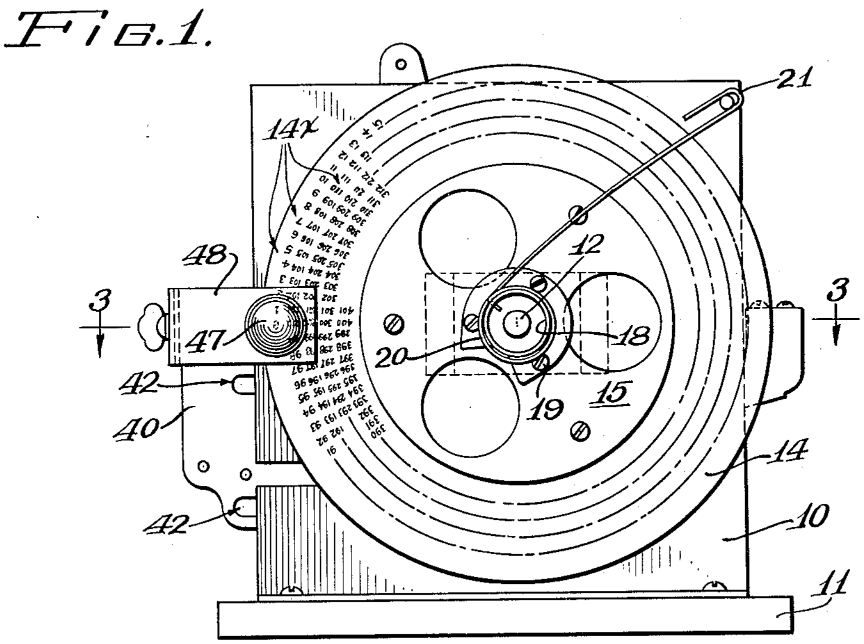
Fig. 1 is a front elevation of the improved score projector.
Figures 3, 4:
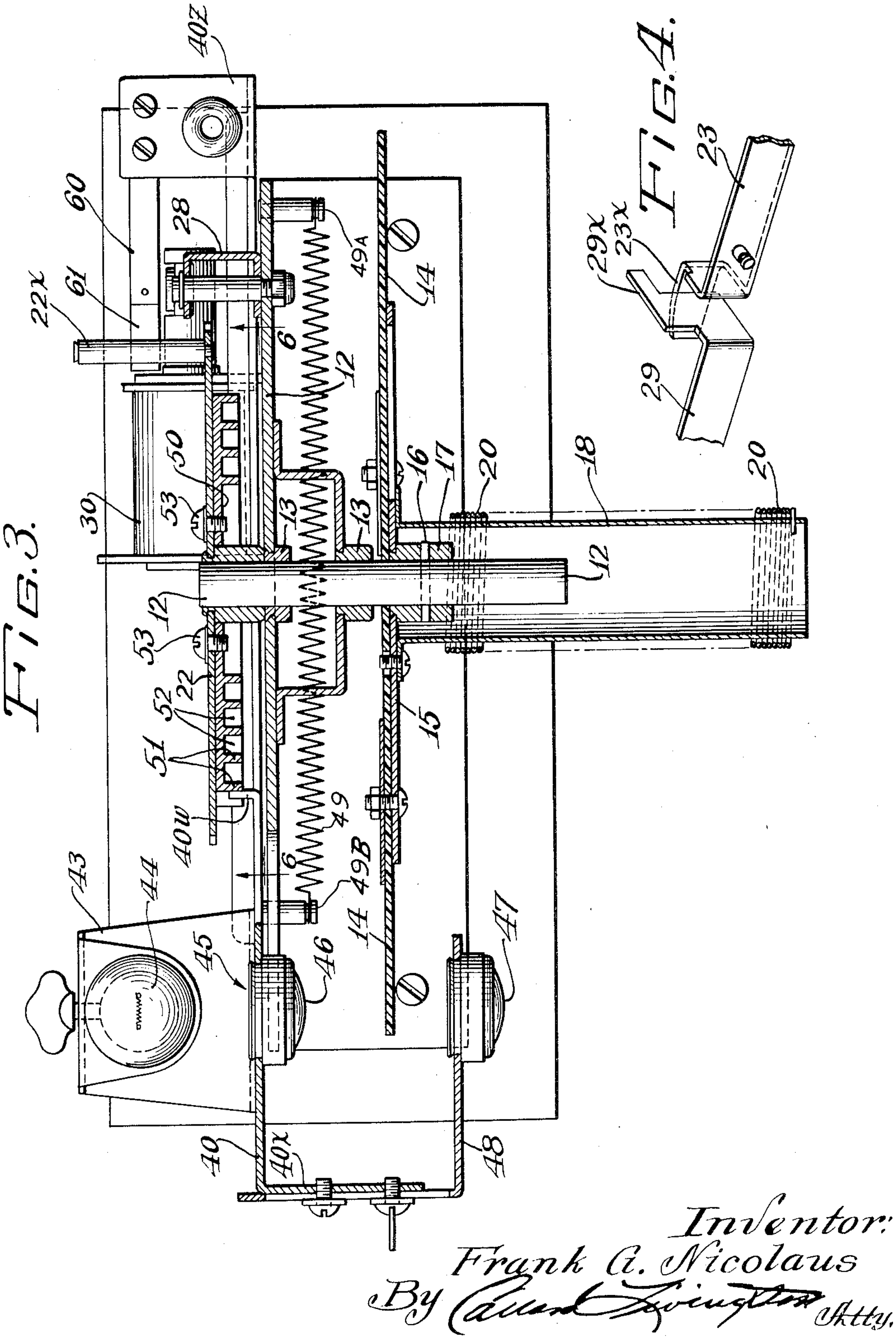
Fig. 3 is a horizontal cross section, to enlarged scale, taken on lines 3—3 of Fig. 1.
Fig. 4 is a fragmentary perspective detail of the interlock of certain tripping pawl levers.

Referring to Fig. 1, the projector includes base plate 11, usually mounted on some sort of a panel 10 in a cabinet (not shown) and having a spindle 12 journaled thereon, as at 13 in Fig. 3.

A translucent number disc 14, mounted on a hub plate 15, is rotatably keyed by pin 16 (Fig. 3) through the spindle and the hub 17.

A tubular spring-carrying sleeve 18 (Figs. 1 and 3) is secured as at 19 to the hub plate, and carries a helical spring 20 anchored at one end on the sleeve and to the plate as at 21 (Fig. 1), for the purpose of turning the number disc in one (retrograde) direction when certain release pawls are actuated.

Figure 2:
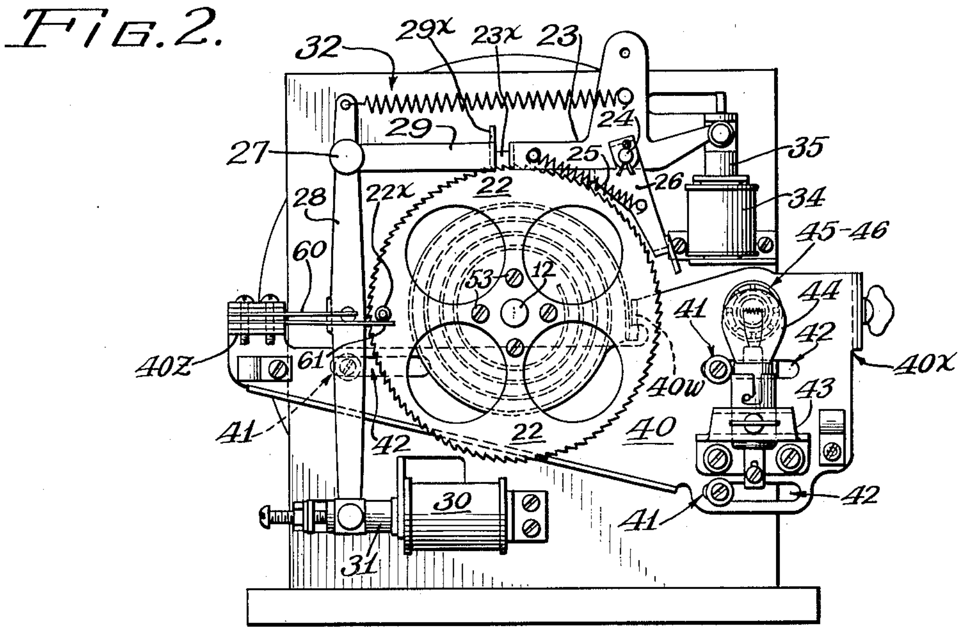
Fig. 2 is a rear elevation of the projector.

As shown in Fig. 2, means for advancing the number disc step-by-step, includes a ratchet wheel 22 normally held by a holding pawl 23 pivoted on the base plate as at 24, and urged into engagement with the ratchet teeth by a spring 25, one end of which is attached to the pawl and the other end of which is attached to a co-pivoted escapement lever 26.

Pivoted as at 27 on a drive lever 28 is an advancing pawl 29, also engaging the ratchet teeth, and having a part 29X (Fig. 4) overlying a part 23X on the holding pawl, such that when the latter is raised to disengage the teeth and free the disc, part 23X will engage part 29X and lift the advancing or driving pawl 29 from the teeth so that the ratchet wheel may retrogress, preferably step-by-step, by reason of the action of spring 25 in pulling the escapement pawl 26 (clockwise) when pawl 23 moves likewise.

Means for actuating the advancing or stepping pawl mechanism includes a solenoid 30 having plunger 31 pivotally connected to the lever arm 28. Spring 32 actually drives the lever on its return stroke to advance pawl 29 and hence advance the ratchet disc one tooth per stroke.

Means for actuating the releasing or returning mechanism for the ratchet disc includes a solenoid 34 having plunger 35 pivotally connected to the holding pawl 23 to lift the latter from the teeth, which in turn causes the escapement pawl 26 to engage the teeth after the disc has escaped by one tooth, the helical spring 20 driving the disc in such return motion.

Figure 5:
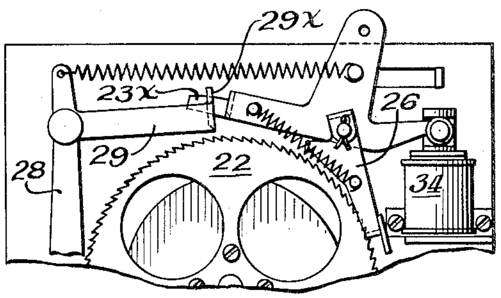
Fig. 5 is a fragmentary elevational detail of the disc-stepping mechanism and release pawls in operated condition.

The relative disposition of the several pawls in released or step-back condition, responsive to an energization of solenoid 34, is illustrated in Fig. 5.

The pawl and ratchet structure and electromagnetic actuating means therefor, described in this juncture, are well known in the art, and constitute the means for rotatably displacing or stepping the number disc 14 relative to the optical or projecting system now to be described.

Referring to Fig. 2, the shiftable optical system includes a slide plate or carrier 40, slidably mounted on the base plate by means of screws 41 in horizontally elongated slots 42, so that the carrier can be said to shift diametrically or radially of the ratchet and number discs. The length of slots 42 determines the travel permitted the carrier 40.

As viewed in Fig. 3, the carrier 40 is urged toward the right by traction spring 49 anchored to a pin 49A on the base plate, and attached to a pin 49B on the carrier.

A bracket 43 (see Fig. 3 also) on the carrier plate mounts a lamp 44 before an aperture 45 in the plate, in which is secured a lens 46 aligned with one side of the number disc 14, and with a second lens element 47 on the opposite side of said disc, the latter lens being adjustably supported on an offset bracket arm 48 secured slidably by set screws on an offset extension 40X of the carrier.

The shifting movements of the carrier and optical elements carried thereby, as viewed in Fig. 2, will cause the lens system to be optically aligned with one or another of the convolute series of numbers generally indicated at 14X, the radial spacing of the spirally evolved columns or series of number characters, and the focal parameters of the lenses, being chosen so that one number in any column, or radially located position, will be projected upon the screen or panel (not shown).

Figure 6:
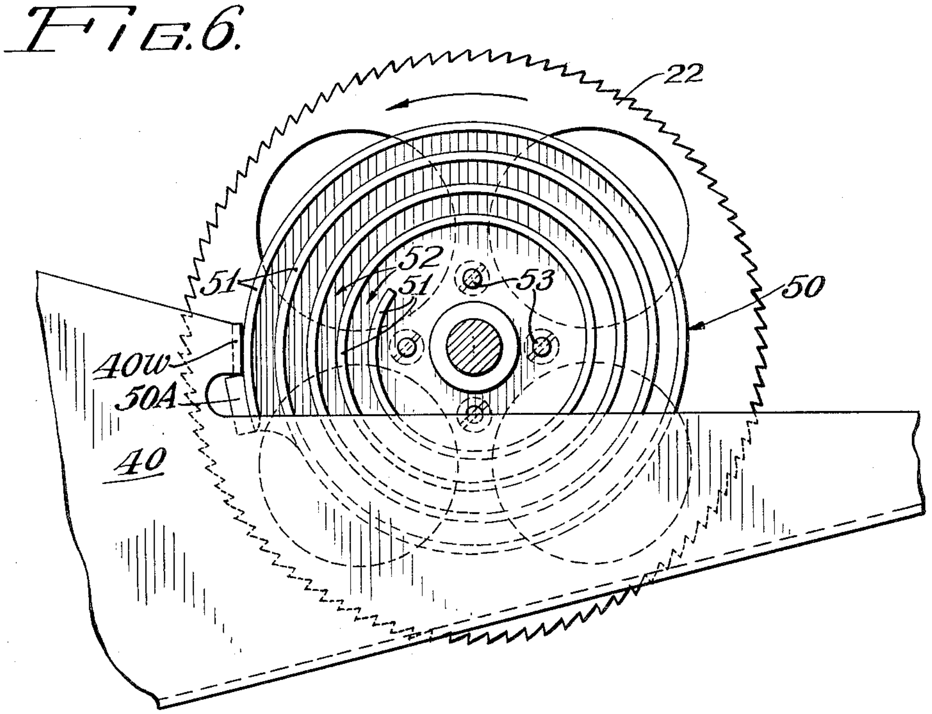
Fig. 6 is an elevational detail of the spiral tracking disc for moving the optical system.

Means for shifting the carrier dependently upon rotary movements or stepping of the number disc means, includes a tracking means or disc 50, shown in Fig. 6, having a spirally evolved rib 51 defining a spiral groove or track 52, into which extends a lug 40W (see Fig. 3 also) offset from the carrier plate.

The spiral tracking disc 50 is secured by screws 53 to the ratchet disc 22; and as a result of stepping movements of the latter in either direction, the spiral track plate 50 moves accordingly and shifts the carrier plate 40 by reason of the disposition of lug 40W in the spiral trackway 52, with the result that the optical system accurately follows the spiral displacements of the numbers. The spring 49 causes the lug 40W to bear against the spiral track or rib, so that the carrier may be said to be spring-driven, thereby lightening the load on the stepping coil 30. As viewed best in Fig. 6, the spiral track may be equipped with a stop lug 50A against which the carrier lug 40W abuts in the starting position of the carrier.

Another feature pertains to the provision of shiftable control means including a stack-switch 60 (Fig. 2) mounted on an offset arm 40Z of the carrier, with a contact blade 61 projecting into the path of a switch-operating pin 22X on the ratchet disc.

The switch 60 is so situated relative to the pin 22X that after the first revolution of the ratchet disc 22 (and hence of the spiral tracking plate 50) the switch is shifted toward the left, Figs. 2 and 3, so that the pin 22X misses the switch blade 61 entirely, and thereafter the ratchet disc may make several additional revolutions without engaging or operating the switch means 60—61.

In the embodiment shown, the switch blade 61 and pin 22X affords a starting or homing stop means to locate the ratchet disc and number disc at a certain starting position (zero), in which position said switch is opened; and the discs may make four complete revolutions in the advancing direction, during which the switch will remain closed for control purposes in conjunction with certain circuit arrangements utilized in score control circuits not shown and not necessary to an understanding of the structure and operation of the novelties disclosed.

The embodiment shown and specifically described affords a score projector including an indicia disc with a spirally evolved series of number images, a radially shiftable carrier having an optical projection system, and tracking means movable with the disc to shift the carrier in step with the angular displacements of the disc, such that the optical system will automatically be aligned with any image as determined by the rotations of the disc; and it is contemplated that changes in the specified form and operation of the parts may be made without departing from the scope of the invention, which is claimed as follows:

1. In a projection-type indicator including a rotatable image disc with radially spaced spirally progressive characters thereon, a spiral tracking device rotated in step with said disc, a carrier mounted to travel along a radial path adjacent said disc, a luminosity source and lens means movable with said disc for projection of indicating characters on the disc, said carrier having a drive part cooperable with said tracking device for shifting of the carrier radially responsive to rotative motions of the disc, a switch on the carrier and including an operating arm positioned by movement of said carrier various distances radially of the axis of said disc, a switch-operating projection and means mounting same radially of the rotative axis for the disc to rotate with the latter to engage and move said switch-operating arm when the latter is positioned by the carrier at a predetermined radial position relative to said axis, but not beyond said position.

2. In a spiral tracking device for a score projector, the combination, with rotatable means including a spiral tracking member, a carrier mounted to travel along a radial path adjacent said rotatable means, and a slidable projection device on said carrier, said carrier coacting with said tracking member to be moved by the latter crosswise of the rotative axis thereof, of control means comprising, namely: switch means mounted on said carrier, and a switch operating member turned with said rotatable means and adapted to be operatively engageable with said switch means in a certain angular position of said rotatable means relative to the path of travel of the switch means with the carrier, said switch means being located on said carrier to be positioned for operative engagement by said switch-operating member only in a predetermined range of travel of the carrier less than the full range of travel thereof.

3. In a spiral displacement device, rotatable ratchet means; a spiral tracking device rotated coaxially with said ratchet means; a pin rotatable with said ratchet means radially of the axis of rotation of said ratchet means; a carrier mounted to shift crosswise of said axis near said ratchet means; means drivingly intercoupling said carrier with said tracking device for shifting of the former by the latter responsive to actuation of said ratchet means; and a switch mounted to move with said carrier across the path of travel of said pin to be engaged and actuated by the latter only when the shifted position of the carrier bears a predetermined relationship to the angular displacement of the pin and ratchet means, whereby said switch is moved into and out of position where it can be actuated by said pin responsive to certain shifting movements of the carrier.

4. In a spiral tracking device of the class described which includes a rotating system and spiral tracking means rotatable therewith through several revolutions of travel, together with a carrier cooperating with said tracking means and shifted back and forth transversely of the rotative axis of said system through a limited range of travel, the combination of stop and control means comprising, namely: switch means movable with said carrier in a path transverse of said axis; a stop member rotatable with said rotating system at a predetermined radial distance from said axis and in an orbit to operatively engage said switch means only when the carrier is disposed in a predetermined portion of its range of transverse travel and near one of the limits of such travel, whereby to afford a registering stop for said rotating system and to actuate said switch means in stopping position, said switch means being moved by the carrier out of the path of said stop member during the remaining portion of the range of travel of the carrier.

References Cited in the file of this patent

UNITED STATES PATENTS

| | | |
|---|---|---|
| 2,077,369 | Karp | Apr. 13, 1937 |
| 2,155,929 | Breitenstein et al. | Apr. 25, 1939 |
| 2,186,753 | Dilks | Jan. 9, 1940 |
| 2,216,512 | Fetter | Oct. 1, 1940 |
| 2,227,017 | Dilks | Dec. 31, 1940 |
| 2,461,756 | Moore | Feb. 15, 1949 |